United States Patent

Honkasalo et al.

[11] Patent Number: 5,864,549
[45] Date of Patent: Jan. 26, 1999

[54] METHOD FOR THE OVERLAYED OPERATION OF TWO RADIO COMMUNICATION SYSTEMS WITH REDUCED INTERSYSTEM INTERFERENCE, AND A RADIO COMMUNICATION SYSTEM FOR OVERLAYED USE

[75] Inventors: Harri Honkasalo; Zhi-Chun Honkasalo, both of Bedford, Tex.; Ari Hottinen, Vantaa, Finland

[73] Assignee: Nokia Mobile Phones, Ltd., Espoo, Finland

[21] Appl. No.: 685,578

[22] Filed: Jul. 24, 1996

[51] Int. Cl.[6] .............................. H04B 7/26; H04J 13/00
[52] U.S. Cl. .................... 370/335; 370/329; 370/342; 455/67.1
[58] Field of Search ...................... 455/67.1; 370/335, 370/331, 332, 342, 252; 375/200

[56] References Cited

U.S. PATENT DOCUMENTS

| | | | |
|---|---|---|---|
| 5,590,409 | 12/1996 | Sawahashi et al. | 455/69 |
| 5,625,889 | 4/1997 | Chikkaswamy et al. | 455/67.1 |
| 5,687,171 | 11/1997 | Shin et al. | 370/335 |
| 5,710,974 | 1/1998 | Granlund et al. | 455/33.2 |

*Primary Examiner*—Chi H. Pham
*Assistant Examiner*—W. Todd Baker
*Attorney, Agent, or Firm*—Brown, Martin, Haller & McClain

[57] ABSTRACT

In the overlayed operation of two cellular radio systems one of the two systems is a small-scale or indoor system and the other is a large-scale or outdoor system. The indoor system monitors the operation of the outdoor system and detects, which part of the available radio resources are temporarily not in use in the outdoor system. The indoor system dynamically selects an unused outdoor channel for indoor operation. The indoor radio traffic is divided into cyclically occurring time slots and some of the slots are used for monitoring the existing radio communication on other outdoor channels so that fast changes according to changing traffic and interference conditions are possible.

10 Claims, 3 Drawing Sheets

5,864,549

METHOD FOR THE OVERLAYED OPERATION OF TWO RADIO COMMUNICATION SYSTEMS WITH REDUCED INTERSYSTEM INTERFERENCE, AND A RADIO COMMUNICATION SYSTEM FOR OVERLAYED USE

FIELD OF THE INVENTION

The invention relates to the field of radio communication networks. Particularly the invention relates to the problem of reducing interference between two radio communication networks that at least partially share a common area of coverage and use the same range of radio frequencies. The invention relates to both a method and a radio communication system applying that method.

BACKGROUND OF THE INVENTION

The telecommunication standard IS-95 (PN-3384), "Personal Station - Base Station Compatibility Requirements for 1.8 to 2.0 GHz Code Division Multiple Access (CDMA) Personal Communications Systems",TIA & ATIS 1994, which is known to tie person skilled in the art, describes the most important technical characteristics of a cellular radio telecommunication system, in which CDMA (Code Division Multiple Access) serves as the multiple access method that divides the radio capacity of the system among several users. The standard has been accepted as the basis of commercial cellular networks in the USA It does not restrict the size of cells of a cellular network, so it allows the operation of overlayed radio communication systems, where the first system is an extensive cellular network with very wide coverage, relatively large cells and, consecutively, high transmission power at both base stations and mobile stations. The second one of the overlayed systems in the sense of the present patent application is an indoor cellular network with very small cell size and very low average transmission power. The second system does not have to be literally indoors, but the concept "indoor cellular network" or "indoor system" is widely accepted in the field to describe this particular kind of a system, which usually operates in office environments.

Indoor systems typically operate either in a different frequency band than outdoor systems or in an overlayed manner, where same frequency bands are used in both systems. The former approach requires frequency planning, in which some central authority allocates the available frequency bands to competing user networks. Frequencies that are exclusively allocated to a certain system but remain unused due to low traffic in that system represent a waste of common radio resources. The latter option, in which the indoor and outdoor systems share common frequency bands, is therefore regarded as superior, because dynamic channel allocation inside said frequency bands between active users uses the available capacity more effectively. There remains the problem of intersystem interference, which means that transmissions in one system appear at the receivers of the other system causing errors and signal corruption. The biggest concern is the interference due to the Outdoor Mobile Stations (OMS's) and Outdoor Base Stations (OBS's) to the indoor system, because their transmission power is much higher than that of the Indoor Base Stations (IBS's) and Indoor Mobile Stations (IMS's) However, it is also beneficial to keep the average transmission power in the indoor system as low as possible, in order to save power in battery-operated mobile stations and to reduce the possibility of indoor to outdoor interference, as well as intrasystem interference between the different stations of the indoor system.

There appears to be no feasible prior art solution that would allow the effective sharing of same frequency bands between overlayed indoor and outdoor radio communication systems while simultaneously preventing mutual interference between the two systems, if both systems rely at least partly on the IS-95 standard in their air interface.

SUMMARY OF THE INVENTION

One object of the present invention is to provide a method for operating a first radio communication system in a way that minimizes intersystem interference between said first radio communication system and a second radio communication system which at least partially shares the same coverage area and transmission frequency band with said first radio communication system. Another object of the present invention is to provide a such method which would at least partially utilize in said first radio communication system the multiple access features of the second radio communication system. A further object of the present invention is to provide a dynamic channel selection feature in a such method, in order to dynamically optimize the channel selection in said first radio communication system.

According to one aspect of the invention there is therefore provided a method for arranging radio communication in a first radio communication system, which operates at least partially within the coverage area of a second radio communication system, which second radio communication system uses a first frequency for downlink radio communication and a second frequency for uplink radio communication, the method comprising the steps of observing the existing radio communication on at least one of the first frequency and second frequency, selecting, on the basis of said observation, one of the first frequency and second frequency for both uplink and downlink radio communication in the first radio communication system, and dividing the radio communication of the first radio communication system on the selected frequency temporally into cyclically occurring time slots.

According to another aspect of the invention there is provided a method for establishing a radio communication connection between a base station and a mobile station in a first radio communication system, which operates at least partially within the coverage area of a second radio communication system, which second radio communication system uses a first frequency for downlink radio communication and a second frequency for uplink radio communication and where the simultaneous downlink communication channels of the second radio communication system on a certain frequency are separated from each other by code division multiplexing with a predetermined set of orthogonal spread codes, the method comprising the steps of synchronizing the base station to the strongest downlink transmission from the second radio communication system it receives, thus preselecting a frequency, measuring in the base station the decoded signal power associated with each orthogonal spread code of the preselected frequency, calculating the general level of radio interference on the preselected frequency, by subtracting from the total received power the sum of all decoded signal powers, if the decoded signal power associated with a first orthogonal spread code is less than a first threshold, and if the general level of radio interference on the preselected frequency is less than a second threshold, selecting the preselected frequency, otherwise preselecting another frequency and repeating the above-mentioned steps until a frequency is selected, transmitting, at the base station, a predetermined pilot signal using the selected frequency and said first orthogonal spread code, decoding in the mobile station the signals associated with the orthogonal spread codes of the selected frequency until said pilot signal is found, and transmitting from the mobile station a signal indicating that the pilot signal has been found.

According to a still further aspect of the invention there is provided a radio communication system for overlayed operation within the coverage area of another radio communication system, comprising at least one base station and at least one mobile station, and at said base station means for detecting and measuring transmissions of the other radio communication system, means for deciding. on the basis of said measurement, which frequency of the other radio communication system contains currently unused capacity, and means for directing the radio communication between the base station and the mobile station to use the detected unused capacity.

The present invention gives the outdoor cellular network a very large freedom to operate as if the indoor system did not exist. It is on the responsibility of the indoor system to monitor, which part of the common radio resources the outdoor system leaves free at each time. The indoor system uses these unused resources as long as the outdoor system does not need them. The decentralized model of the invention guarantees that there may be a multitude of separate indoor systems in the coverage area of the outdoor system, new systems may be introduced and old system may be shut down without affecting the operation of the outdoor system, which has a more stable nature.

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
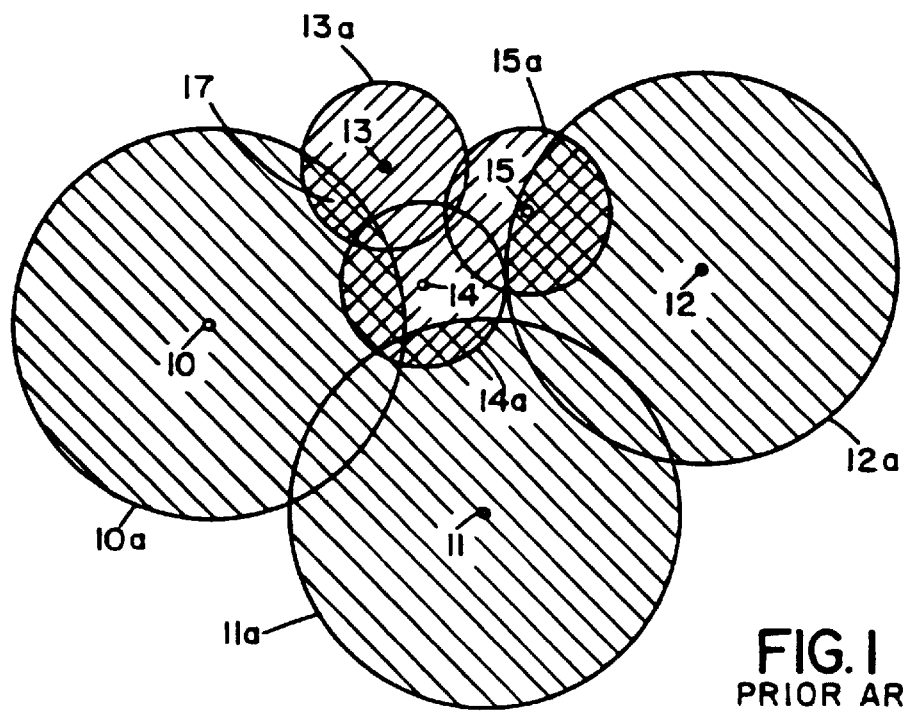
FIG. 1 illustrates the known geometry of overlayed operation.

FIG. 1 illustrates an exemplary situation where an indoor cellular network and an outdoor cellular network partially overlap. Each Outdoor Base Station 10, 11, 12 has a respective coverage area 10a, 11a, 12a. Also each Indoor Base Station 13, 14, 15 has a coverage area 13a, 14a, 15a. On the cross-hatched geometrical intersections of the indoor and outdoor coverage areas there is an overlap, where a mobile station may receive transmissions from both systems. In some other configurations an indoor cellular network may exist in an area that is completely covered by the coverage cells of cunt outdoor system, resulting in comprehensive spatial overlap. The proportional sizes of the coverage areas in FIG. 1 have been chosen for the sake of graphical clarity. Usually the outdoor system has a much larger average cell size than the indoor system. Some proposed dual-mode mobile stations may be able to choose between the different systems on the overlap area, whereas a conventional single-mode mobile station that is only operable in one system regards the transmission from the other system as noise. In any case it is preferable that an Outdoor Base Station and an Indoor Base Station do not transmit similar signals simultaneously on the same frequency, because in the absence of any multiple access methods it would be impossible to separate the two transmissions from each other in reception The location of an Outdoor Base Station in relation to the indoor cellular network is fixed, so each time the Outdoor Base Station produces a radio transmission using a certain output power an observer in the indoor coverage area measures essentially a constant signal power level Transmission power control algorithms in the Outdoor Base Station may cause it to use different output power at different times, but the disturbance it causes to the indoor system is anyhow easily estimated. According to the transmission direction in the outdoor system this is called the forward link disturbance. On the other hand, an Outdoor Mobile Station is by definition free to move in relation to any fixed observer, so it may transmit from a location that is very close or even inside the coverage area of the indoor system, or very far from it at an edge of the outdoor coverage area that lies far away from the indoor system. Additionally the Outdoor Mobile Station also has some output power control features. The strength of the reverse link disturbance thus caused to the indoor system is therefore not easily calculable beforehand.

Thus, in a practical situation our observer in the indoor cellular network sees widely varying interference conditions on each two-way channel that comprises a forward (downlink) traffic channel and a reverse (uplink) channel. If the outdoor system temporarily does not use the two-way channel at all, there is no interference. An active but distant Outdoor Mobile Station produces only weak reverse link disturbance but relatively strong forward disturbance. The same holds for a nearby Outdoor Base Station. Conversely, a nearby Outdoor Mobile Station causes strong reverse link disturbance but only relatively weak forward link disturbance Typically one component channel (forward or reverse channel) of the two-way channel has a much higher interference level than the other.

The present invention proposes that the indoor cellular network monitors continuously or at least very regularly the interference level on a multitude of outdoor-based one-way component channels. When it detects a relatively undisturbed outdoor channel, it allocates it for one of its own communication links between Indoor Base Stations and Indoor Mobile Stations. It continues, however, to monitor the dynamically changing inteference situation and redirects all indoor-related communication from a channel with increasing outdoor-based interference to a more appropriate channel, whenever necessary. As the interference situation in an outdoor-based two-way channel is asymmetrical as described above, it is beneficial to use in the indoor system the capacity of only that component channel that has the lowest interference level. The indoor system splits the capacity of his originally one-way component channel between the indoor uplink and indoor downlink channels by means of TDMA (Time Division Multiple Access), CDMA or both.

The present invention does not limit the channel selection of the indoor system. It may use always an outdoor forward channel, if simulation and/or practical experiments in a certain practical case show that the more structured and stationary forward link disturbance makes the outdoor forward channel always the most appropriate choice. Alternatively, it may use either the outdoor forward or the outdoor reverse channel depending on the changing interference conditions It may even use regular channel hopping or fast-reacting dynamic channel changes, in the course of a communication, between the outdoor forward and outdoor reverse channels.

Figure 2:
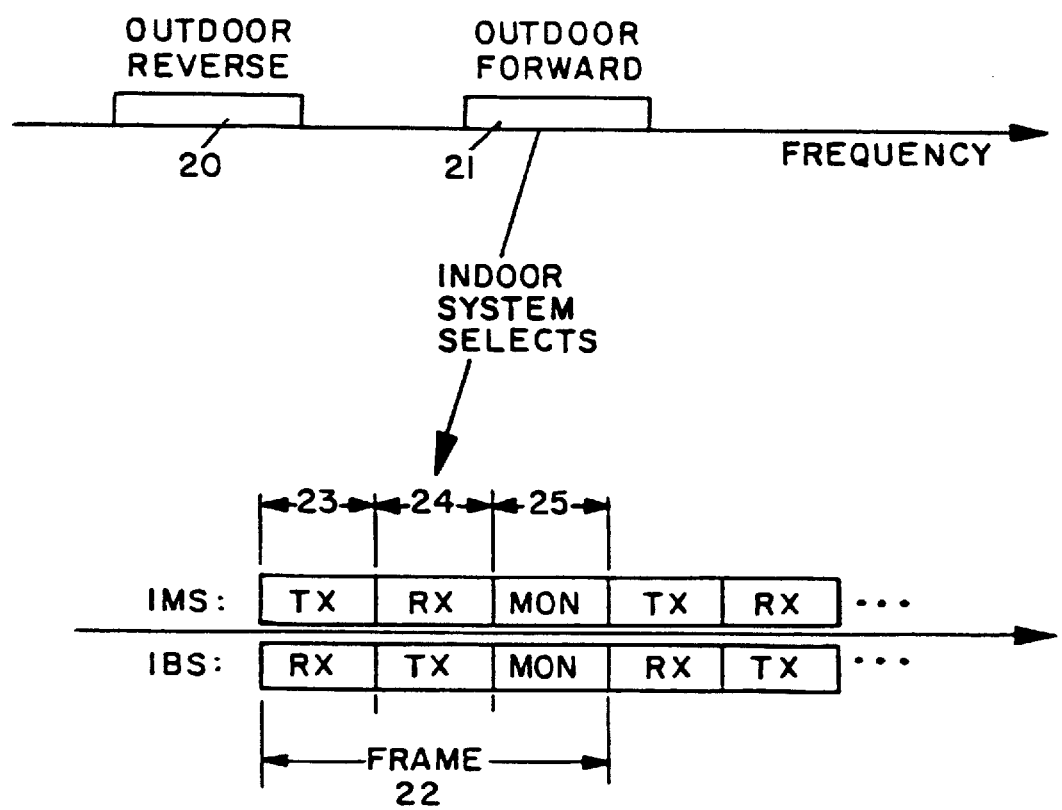
FIG. 2 illustrates the channel selection and time division processes of the invention.

FIG. 2 illustrates the exemplary indoor channel selection and organisation according to a preferable embodiment of the invention. In a typical outdoor cellular network the forward and reverse channels occupy different frequency bands with a certain bandwidth and a separating duplex interval between them. In such cases the discussion of outdoor forward and outdoor reverse channels above refers to the respective frequency bands 20 and 21 in FIG. 2. Let us assume that the indoor system has detected a suitably low interference level on the outdoor forward frequency band 21. It allocates this frequency band for communication between an Indoor Base Station and an Indoor Mobile Station. To enable the Indoor Base Station and the Indoor Mobile Station to share a single frequency band tie indoor system divides the communication time on the selected frequency band into consecutive frames of suitable duration, for example 20 milliseconds.

The lower part of FIG. 2 illustrates the temporal organisation of communication in the indoor system, where a TDD (Time Division Duplex) method separates the transmission and reception at each station. A frame 22 is further divided into intervals or time slots 23. 24, and 25. During the first interval 23 in each frame, the Indoor Mobile Station transmits and the Indoor Base Station receives. During the second interval 24 in each frame, the Indoor Base Station transmits and the Indoor Mobile Station receives. Both stations use the receive and/or transmit intervals also for interference monitoring on the channel they are using. The easiest way to monitor interference is during reception, whereby the total received power minus average decoded signal power gives the average interference level in decibels.

During the third interval 25 in each frame, at least one of the stations but preferably both stations monitor the interference levels on a group of alternative channels. The purpose of the monitoring interval 25 is that at least one of the stations (preferably both stations) may continuously look for a more suitable frequency band. The interference level on other channels is equal to the total received signal power on that channel. averaged over a certain time period. The lengths of all averaging periods may be system parameters which the Indoor Base Station may set by including them into a general broadcast message or a control message directed at a certain mobile station or a group of mobile stations.

In an embodiment where both the Indoor Base Station and the Indoor Mobile Stations monitor the interference levels on "candidate" channels, it is beneficial that they combine their measurement results regularly for comparison. The Indoor Mobile Stations shall report their measurements to the Indoor Base Station for example through signalling on some low-rate signalling channel. Based upon Indoor Mobile Station reporting and its own measurements, the Indoor Base Station makes the decisions to choose the currently best channel for use. If during a call connection the interference level on the current channel increases for example due to increasing outdoor transmission activity, the Indoor Base Station shall initiate a handoff to the indoor user to another channel where the interference is lower If during idle mode the channel needs to be changed, the Indoor Base Station shall announce to the Indoor Mobile Station the new channel upon a paging message, which it is assumed to transmit every now and then according to the general principles of cellular radio networks.

The definition of a frame and its organisation into intervals is presented in FIG. 2 as an example only; it is obvious to a person skilled in the art that the order of the intervals as well as their sizes in relation to each other may be widely varied. Guard intervals may be introduced between the transmission and reception time slots to prevent simultaneous transmission from both stations. Other intervals may also be defined and included in the frame structure, for example for the exchange of control messages and signalling between the two stations. Signalling is more frequently carried out on a separate signalling frequency that is internal to the indoor system.

Outdoor to indoor interference may be reduced even further if the outdoor system employs Code Division Multiple Access. A CDMA Outdoor Base Station uses one or more carrier frequencies by spreading a multitude of independent transmission streams into a frequency band that is associated to each carrier. The spreading codes are orthogonal to enable each receiver to cancel out all other signals than the one it wants to receive. Orthogonality requires syncronization on the bit level between different transmission streams in the transmitter. Decoding a CDMA transmission requires that the receiver is able to synchronize itself into the transmitted sequence at the chip level, where a chip represents the length of one bit in the transmission. The CDMA technology is well known in the art and adapted for cellular network use for example in the IS-95 standard that was mentioned earlier.

In an advantageous CDMA embodiment of the invention the indoor system reuses some of the multiple access codes that a nearby Outdoor Base Station does not use on a chosen outdoor forward carrier for a given moment. In the absense of multipath propagation the signals transmitted by an IS-95 Outdoor Base Station are orthogonal. Typically only a subset of all possible independent transmission channels are in use since the downlink cannot accommodate 64 users, which is the theoretical maximum according to the IS-95 standard. Practical scenarios propose a typical amount of 10–20 simultaneous users on a single carrier. Thus a significant number of orthogonal channels are available for other use.

In order to keep the outdoor system orthogonal to the indoor system all signals that an Indoor Base Station or an Indoor Mobile Station receives should be perfectly synchronous. In practice, some imperfection must be allowed. The aim is to calculate at each indoor transmitting station the necessary transmission delays so that their transmissions arrive at the receiving station in syncronisation with each other and with the simultaneously ongoing outdoor transmissions from a nearby outdoor transmitting station. The Indoor Mobile Stations are located in different places and, in general, the impulse response from the considered Outdoor Base Station to these indoor locations is different. Therefore the Indoor Base Station controls the delays of all downlink channels indoors separately. This means that the downlink signals transmitted indoors cannot be orthogonal (walsh codes, which are commonly used as spreading codes in CDMA are not orthogonal if asynchronous). This should not be a severe problem since most of the interference come from outdoors, and power control and/or multiuser detection, which methods are known as such, can be applied for the indoor signals. For indoor uplink the problem of synchronization is easier to solve, because there is only one Indoor Base Station serving a multitude of Indoor Mobile Stations and each of them may calculate the necessary transmission delays to that their uplink transmissions arrive synchronously at the Indoor Base Station.

The implementation of the proposed synchronization scheme is as follows. When the indoor system investigates the possibility of using a given outdoor forward frequency or RF channel, each Indoor Base Station shall attempt to synchronise with the most powerful Outdoor Base Station signal it receives. The pilot code of the Outdoor Base Station can serve as the synchronization basis and the strongest outdoor signal component is taken for reference in a multipath situation. After achieving the synchronization the Indoor Base Station shall measure tile signal level at the output of its WHT (Walsh Hadamard Transform) block for each of the employed walsh functions (of which there are 64 according to the IS-95 standard). Based on the measurement results the Indoor Base Station decides which orthogonal code (or which subset of orthogonal codes) can be used for this indoor cell if the given RF channel is selected. Low measured power associated with a walsh function indicates that the function is not in use.

In addition to the code usage investigation the selection process at the Indoor Base Station includes a measurement of the general RF interference level on the given RF channel. The Indoor Base Station calculates it by subtracting from the total received power the sum of all signal powers at the output of the WHT. If the interference level thus obtained is lower than a preselected threshold value, the Indoor Base Station selects the RF channel for use. All transmission and reception will then take place by using tie walsh codes that were unused in the outdoor system, The selected usable orthogonal codes may vary from time to time and the Indoor Base Station will inform the Indoor Mobile Stations when this happens. In an alternative embodiment each Indoor Mobile Station may also maintain a list of suitable unused channels, whereby the choice of a channel is always a result of negotiation between the Indoor Base Station and the Indoor Mobile Station concerned. A preferable negotiation procedure starts by a channel proposal sent by one of the stations and continues by an ACK (Acknowledged) or NACK (Not acknowledged) message from the other station. The maintaining of channel lists in both Indoor Base and Mobile Stations has the advantage that the effort for finding the optimal frequency and a code is at least doubled compared to the alternative where the Indoor Base Station alone makes the selection.

An alternative to the selection and maintenance of a sub-set of unused codes is to employ code hopping. A predetermined code hopping pattern is employed once the Indoor Mobile Station has set up an active connection with the Indoor Base Station. The advantage of this alternative embodiment is that the Indoor Base Station does not need to update the sub-set of usable codes.

The pilot signal of the Indoor Base Station is an inherent feature of an IS-95-based CDMA system. It is an unmnodulated, direct-sequence spread spectrum signal transmitted preferably continuously by each Indoor Base Station. The pilot signal allows a mobile station to acquire the tiring of the forward CDMA channel, provides a phase reference for coherent demodulation, and provides a means for signal strength comparisons between base stations for determining when to handoff According to one embodiment of the invention the pilot signal of the Indoor Base Station shall use one of the selected orthogonal codes and the Indoor Base Station may dynamically associate its pilot signal with a different code. The Indoor Mobile Stations should decode all 64 walsh functions in order to fmd the Indoor Base Station's pilot signal, which carries the unique identification code of the Indoor Base Station to facilitate its finding. If there is a powerful Outdoor Base Station's pilot signal also present, it may be helpful for the Indoor Mobile Station to first achieve synchronization with the outdoor pilot and only then lock onto the Indoor Base Station.

According to the IS-95 standard the base stations of the outdoor system are identified by different pilot PN (PseudoNoise) sequence offsets. To reduce the need for intersystem administration it would be helpful if the same pilot PN sequence offsets could be used freely in the indoor systems. However, if the pilot PN sequence offset of an Indoor Base Station is the same as that of an Outdoor Base Station, there exists a possibility that an Outdoor Mobile Station gets confused and locks to an indoor pilot signal. Another embodiment of the invention therefore employs a code hopping pilot signal in the indoor system with a fixed and known code hopping pattern. Such a code hopping pilot should serve at least for the handoff purpose. If the code hopping pilot has good enough signal quality it can also provide phase reference for coherent detection. If not, the phase reference may be implemented by a dicontinuous pilot signal consisting of phase reference symbols multiplexed onto used traffic channels (this would produce about 1–5% signal overhead). Both the code hopping and discontinuous pilot signals may be used simultaneously. The code hopping pilot would naturally avoid all channels that would disturb the operation of an outdoor system, like the walsh code 0 outdoor pilot signal, possible paging channels and so on. Yet another possibility is to use a completely different pilot sequence indoors, e.g. a long PN code that is different from those used in the outdoor system or a short code taken from a Kasami or gold set (a gold code is a code that is generated by adding, modulo two, the outputs of two spread-spectrum code-sequence generators). Outdoor Mobile Stations would certainly not lock to the pilot signal thus produced, because the new kind of code generators would only operate in Indoor Mobile Stations.

If the synchronization fails, i.e. the Indoor Mobile Station is not in synchronism with both base stations, the Indoor Mobile Station will not be able to establish a connection with the Indoor Base Station since the interference level is too high on that RF channel. The Indoor Base Station is assumed to page the Indoor Mobile Stations regularly and ask them to respond to the paging message, in order to ensure that the connection is functional all the time. When an Indoor Mobile Station fails to respond, the Indoor Base Station shall assume that there is a synchronization problem and it must abort the current RF channel and make another selection.

When the Indoor Mobile Station is in idle mode, i.e. it has no call connection with the Indoor Base Station, the responsibility of regularly monitoring the interference level on different channels is on the Indoor Base Station. The Indoor Mobile Station will only perform the monitoring after each paging.

The Indoor Mobile Station must have a power-on procedure that ensures that it finds the Indoor Base Station's transmission. The default RF channel is preferably the one that was in use when the Indoor Mobile Station was switched off. If it is not available, the Indoor Mobile Station shall monitor a predefined set of RF channels, which set may be organised according to the prior use of the RF channels. The set may also be an expanding arrangement of RF channels, whereby the Indoor Mobile Station first monitors a relatively small set of previously used RF channels and extends the search to more rarely used RF channels if necessary.

The previously mentioned IS-95 standard may well serve as the basis for the radio interface in an overlayed indoor cellular network according to the invention. The Time Division Duplex method that defines the transmission, reception, and monitoring intervals in a frame requires, however, that the transmission times should be reduced to only a fraction of the original transmission times in an IS-95 network. One possibility is to reduce the processing gain of a IS-95 forward link by the factor 3, whereby the transmission and reception times may be shortened to one third of the original. We may use the thus modified IS-95 forward link for both forward and reverse links indoors. This solution applies to the case that was presented previously, with the indoor TDD frame divided into three equal intervals for transmission, reception and monitoring. The present invention does not limit the method through which the reduction in processing gain is achieved. A suitable method is for example to puncture the output of a symbol repetition stage in each transmitting apparatus. This method is described next with reference to FIGS. 3 and 4, where the same reference numbers are used for counterpart blocks.

Figure 3:
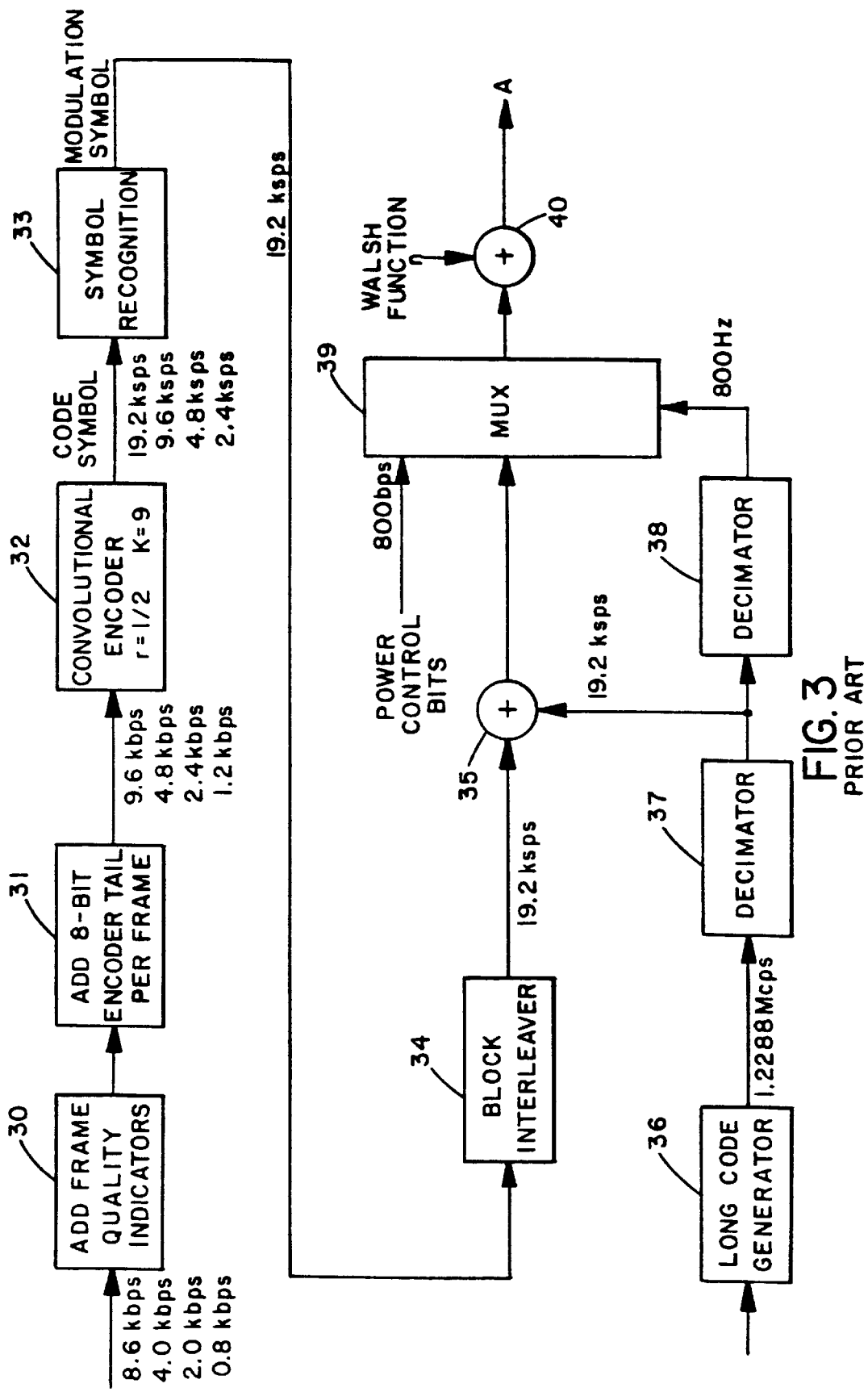
FIG. 3 is a block diagram of a known IS-95 transmitter section.

FIG. 3 illustrates the blocks that take part in the traffic channel information processing in a prior art IS-95 transmitter, with Rate Set 1 (user bit rates 8600, 4000, 2000 and 800 bps). Block 30 adds frame quality indicator bits to each user frame on the 8600 or 4000 bps user bit rate. One must note that a user frame is a concept of the IS-95 standard and it is completely different than the TDD frame according to the invention and illustrated in FIG. 2. Block 31 adds an eight-bit Encoder Trail to each frame. At this stage the bit rates are 9600, 4800, 2400 and 1200 bps. The convolutional coder block 32 performs a convolutional encoding operation with a code rate of ½ and a constraint length of 9, resulting in code symbols with symbol rates of 19.2, 9.6, 4.8, and 2.4 ksps Thereafter a symbol repetition block 33 produces an even symbol rate of 19.2 ksps by repeating each of the lower data rate symbols as many times as it takes to raise the symbol rate to the required value. The resulting modulation symbols are block interleaved in block 34 and scrambled in adder 35 with the help of a long code generator 36 and a decimator 37. A fiber decimator 38 and a multiplexer 39 are used to multiplex the data stream with the information on the power control subchannel and the result is code spread in adder 40. The data stream at point A is further lead to quadrature spreading, filtering, and upmixing, which are not shown in the Figure. The whole procedure is described in detail in chapter 3.1.3, "Modulation Characteristics",of the IS-95 standard.

Figure 4:
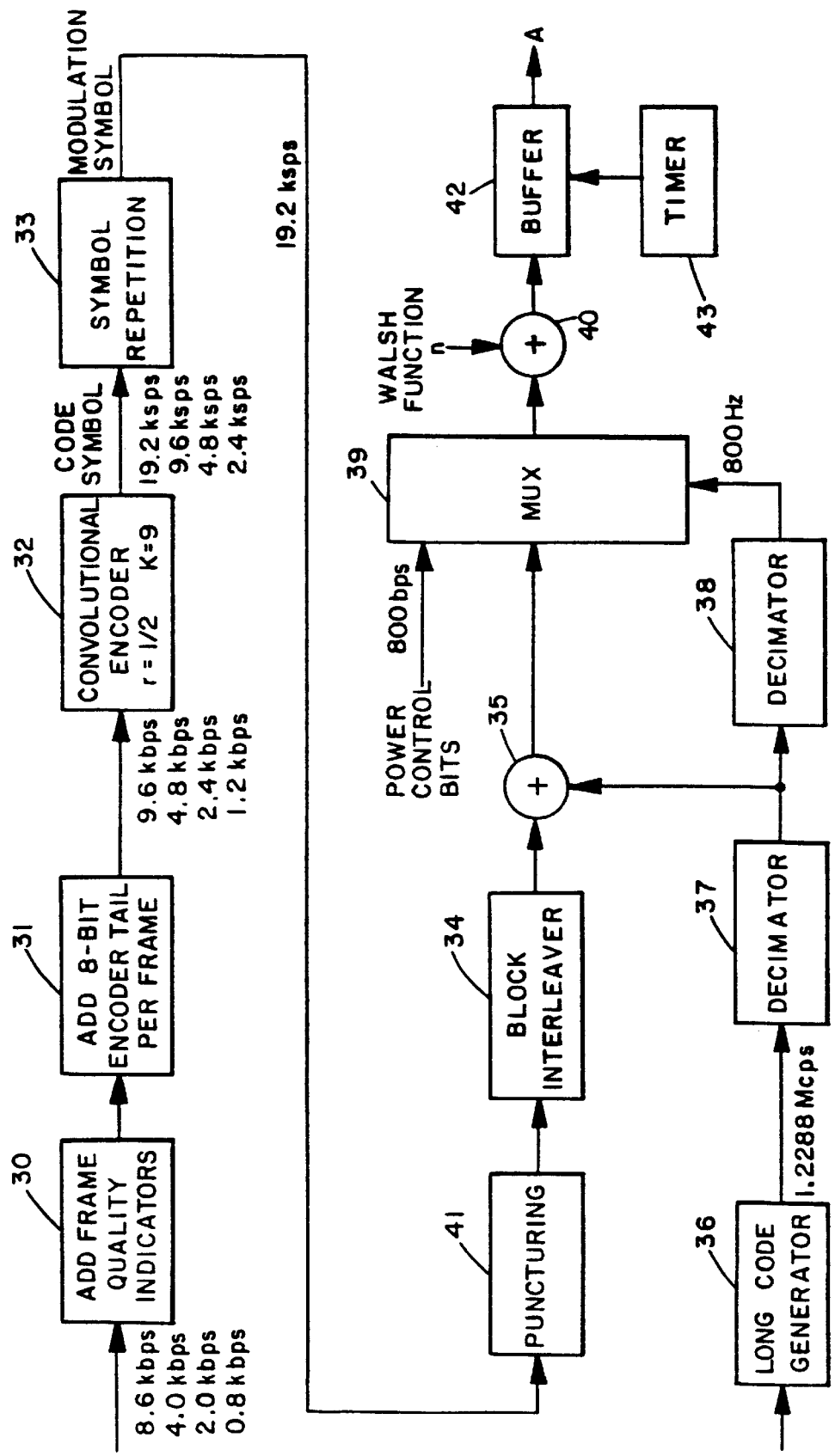
FIG. 4 is a block diagram of a transmitter section according to the invention.

In FIG. 4, the operation of the blocks 30–40 is the same as in the description above. A puncturing block 41 has been added between the symbol repetition block 33 and the block interleaving block 34. Puncturing means that a predetermined deletion pattern is repeatedly applied to delete some of the symbols from the data stream. The effective code rate is the rate of the convolutional code divided by the puncturing rate (the latter is defined as the ratio of passed symbols to the total number of symbols per unit time). By selecting a suitable puncturing rate and choosing an appropriate length (for example 32) of walsh codes for the code spreading operation in adder 40 the effective processing gain may be lowered to the desired value. In addition to the blocks described above FIG. 4 shows a buffer 42 and a timer 43 which enable the transmission during only those time slots that are allocated for transmission by the TDD control of the indoor system. Transmitting in cyclically occurring bursts in certain allocated time slots is known as such from previous TDD and TDMA (Time Division Multiple Access) systems. From point A the signal is again lead to quadrature spreading, filtering, and upmixing, which are not shown in the Figure. Both puncturing and buffering are signal processing operations known as such, but combining them to the otherwise IS-95-conforming transmitter to produce the TDD embodiment of the present invention is considered to be novel and inventive.

A significant advantage of the method and radio communication system according to the invention, when compared with prior art, is that the system parameters of the outdoor and indoor systems are kept as similar as possible. Frequency bands are (at least partially) the same, system clocks work similarly, data structures and signalling structures are the same and so on. Because of the single-frequency-TDD nature of the indoor system, Outdoor Mobile Stations cannot operate as visiting indoor stations as such, but this is not regarded as a major drawback, since in an overlayed configuration the Outdoor Mobile Stations may all the time communicate with Outdoor Base Stations. If a telephone communication between an Indoor Mobile Station and an Outdoor Mobile Station is desired, it may be routed through both. networks just as easily regardless of whether the Outdoor Mobile Station is physically visiting the office where the indoor system operates or not.

Because the invention mostly alleviates the problem of outdoor noise interfering with the indoor cellular network, the average transmission power that is required of Indoor Base Stations and Indoor Mobile Stations decreases. This has the effect of reducing intrasystem interference i.e. the noise caused to indoor communications by other indoor communications. Additionally the lowered average transmission power saves energy, whereby the batteries of Indoor Mobile Stations last longer.

The present inventive concept may be broadened to cover a case where the outdoor system does not employ frequency division duplex. If the outdoor system has only one possible frequency band which is divided into forward and reverse channels through time division duplex or code division multiplexing, the indoor system may monitor the use of the forward and reverse time slots or spread codes and dynamically select the channel(s) represented by the most appropriate time slot or code(s) for indoor use.

What we claim is:

1. A method for establishing a radio communication connection between a base station and a mobile station in a radio communication system which operates at least partially within a coverage area of a second radio communication system, which second radio communication system uses a first frequency for downlink radio communication and a second frequency for uplink radio communication and where a plurality of simultaneous downlink communication channels of the second radio communication system on the first frequency are separated from each other by code division multiplexing with a predetermined set of spread codes, the method comprising the steps of:

synchronizing the base station to a strongest downlink transmission from the second radio communication system to preselect a preselect frequency;

determining a decoded signal power associated with each of the set of spread codes on the preselect frequency;

measuring a general level of radio interference on the preselect frequency; and selecting a communication frequency for the first communication system on the basis of the decoded signal power associated with each of the set of spread codes and on the general level of radio interference.

2. A method according to claim 1, wherein the step of selecting the communication frequency comprises the steps of:

selecting at least one spread code of the set of spread codes that appears to be unused; and selecting the preselect frequency for communication in the first communication system only if the general level of the radio interference is below a predetermined threshold.

3. A method according to claim 2, wherein the step of selecting the communication frequency comprises the step of selecting the preselect frequency as the communication frequency only if the decoded power of a first spread code is below a code threshold.

4. A method according to claim 2, wherein the step of selecting a communication frequency comprises:

synchronizing to a second preselect frequency;

determining a decoded signal power associated with each of a plurality of spread codes on the second preselect frequency;

measuring a general level of radio interference on the second preselect frequency; and selecting the second preselect frequency as the communication frequency for the first communication system only if the general level of radio interference on the second preselect frequency is below a second predetermined threshold.

5. A method according to claim 4 further comprising the step of transmitting, at the base station, a predetermined pilot signal using the communication frequency and the first spread code.

6. A method according to claim 5 further comprising the steps of:

decoding, in the mobile station, signals associated with the spread codes of the selected frequency until the pilot signal is found; and transmitting from the mobile station a signal indicating that the pilot signal has been found.

7. A method according to claim 3, further comprising the steps of observing, during an active connection between a mobile station and a base station of the first radio communication system, the usage of other orthogonal codes than the ones used for communication between said mobile station and said base station, and changing, during said active connection, at least one of the codes used for communication between said mobile station and said base station to another code on the basis of the code usage observation.

8. A method according to claim 3, further comprising the step of changing, during an active connection between a mobile station and a base station of the first radio communication system, at least one of the codes used for communication between said mobile station and said base station to another regularly according to a predetermined code hopping arrangement.

9. A method for establishing a radio communication connection between a base station and a mobile station in a first radio communication system, which operates at least partially within the coverage area of a second radio communication system, which second radio communication system uses a first frequency for downlink radio communication and a second frequency for uplink radio communication and where the simultaneous downlink communication channels of the second radio communication system on a certain frequency are separated from each other by code division multiplexing with a predetermined set of orthogonal spread codes, the method comprising the steps of synchronizing the base station to the strongest downlink transmission from the second radio communication system it receives, thus preselecting a frequency, measuring in the base station the decoded signal power associated with each orthogonal spread code of the preselected frequency, calculating the general level of radio interference on the preselected frequency, by subtracting from the total received power the sum of all decoded signal powers, if the decoded signal power associated with a first orthogonal spread code is less than a first threshold, and if the general level of radio interference on the preselected frequency is less than a second threshold, selecting the preselected frequency, otherwise preselecting another frequency and repeating the above-mentioned steps until a frequency is selected, transmitting, at the base station, a predetermined pilot signal using the selected frequency and said first orthogonal spread code, decoding in the mobile station the signals associated with the orthogonal spread codes of the selected frequency until said pilot signal is found, and transmitting from the mobile station a signal indicating that the pilot signal has been found.

10. A base station of a radio communication system, the radio communication system overlayed within a converge area of a second communication system, the base station comprising:

a synchronizer adapted to synchronize to a strongest downlink transmission of the second communication system;

a power detector adapted to detect a decoded signal power associated with each of a plurality of spread codes on a preselect frequency;

an interference detector adapted to measure a general level of radio interference on the preselect frequency; and a selector adapted to selecting a communication frequency for the first communication system based on the decoded signal power associated with each of the plurality of spread codes and on the general level of radio interference.

* * * * *